UNITED STATES PATENT OFFICE.

T. H. LEAVITT, OF BOSTON, MASSACHUSETTS.

IMPROVED MATERIAL FOR DUSTING THE MOLDS OF PEAT-MACHINES.

Specification forming part of Letters Patent No. 53,014, dated March 6, 1866.

*To all whom it may concern:*

Be it known that I, T. H. LEAVITT, of Boston, in the county of Suffolk and State of Massachusetts, have invented a new and Improved Material for Dusting the Boxes or Forms Employed for Molding Prepared Peat, for the purpose of preventing the peat from adhering to boxes, forms, or molds, of which the following is a full, clear, and exact description.

In the process which I employ in the preparation of peat for fuel the crude material as it is dug from the bog is submitted to the action of revolving knives and rubbers, by which the fibers with which it is filled are cut up and the whole mass is brought to a homogeneous plastic state. The machinery by which this is effected forms the subject of another application for patent made simultaneously with this, and need not now therefore be further described. The peat when thus prepared is formed into small blocks or rectangular lumps in a manner similar to that employed in the manufacture of bricks from clay, and it is manifest that it is necessary in some way to prevent the wet peat from adhering to the molds. For this purpose I have tried various experiments; but that which I prefer, and which forms the subject of the present application for patent, consists in dusting the molds with some of the same material (peat) dried and powdered, by which the wet peat is effectually prevented from adhering to the molds, and the blocks or bricks may be easily emptied out whole, and with smooth and perfect faces, upon the drying-ground.

Any efficient method of drying the peat and of reducing it to a powder may be adopted; but that which I prefer and have found to answer a good purpose consists in submitting the crude peat to the action of revolving knives, crushers, and rubbers, as before mentioned, by the action of which it is brought to a homogeneous plastic mass, and in subsequently drying the same, either in the sun or by articial means. The peat thus prepared is then reduced to a powder by grinding, pounding, or in any suitable manner.

To prevent the wet peat from adhering to the wet molds after the blocks of peat have been turned out of them, the latter are entirely dusted over with the powdered peat thus produced, as much of it being allowed to adhere to the molds as will, and this effectually prevents the wet prepared peat from adhering to the molds.

I do not limit myself to any particular method of preparing, drying, or grinding the peat; but

What I claim as my invention, and desire to secure by Letters Patent, is—

The use of powdered peat for the purpose of preventing the prepared peat from adhering to the molds, as set forth.

T. H. LEAVITT.

Witnesses:
    FRANCIS HUNNEWELL,
    H. B. MACKINTOSH.